United States Patent
Lietz et al.

(10) Patent No.: US 10,358,858 B2
(45) Date of Patent: Jul. 23, 2019

(54) METHODS AND SYSTEMS TO INDICATE THE STATUS OF DOOR OPERATIONS

(71) Applicant: Rite-Hite Holding Corporation, Milwaukee, WI (US)

(72) Inventors: Ben Lietz, Fond Du Lac, WI (US); John Sealy, Seattle, WA (US); Jon Schumacher, Hubertus, WI (US); Kyle Nelson, Cedarburg, WI (US); Perry W. Knutson, Lancaster, WI (US); Pete Olsen, Mequon, WI (US); Ryan P. Beggs, Dubuque, IA (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

(21) Appl. No.: 15/417,032

(22) Filed: Jan. 26, 2017

(65) Prior Publication Data

US 2017/0138111 A1 May 18, 2017

Related U.S. Application Data

(60) Continuation of application No. 15/187,503, filed on Jun. 20, 2016, which is a division of application No. 14/453,237, filed on Aug. 6, 2014, now abandoned.

(51) Int. Cl.
*E06B 9/68* (2006.01)
*E05F 15/70* (2015.01)
(Continued)

(52) U.S. Cl.
CPC .............. *E05F 15/70* (2015.01); *E05F 15/40* (2015.01); *E05F 15/668* (2015.01); *E05F 15/77* (2015.01);
(Continued)

(58) Field of Classification Search
CPC ...... E06B 9/68; E06B 9/82; E06B 2009/6818; E06B 2009/6836; E05F 15/70;
(Continued)

(56) References Cited

U.S. PATENT DOCUMENTS

| 4,821,024 A | 4/1989 | Bayha |
| 5,170,585 A | 12/1992 | Wen |

(Continued)

FOREIGN PATENT DOCUMENTS

| CN | 1745225 | 3/2006 |
| CN | 203223858 | 10/2013 |

(Continued)

OTHER PUBLICATIONS

Liftmaster, Smart Control Panel Model 880LM manual; 2011 (Year: 2011).*

(Continued)

*Primary Examiner* — Katherine W Mitchell
*Assistant Examiner* — Abe Massad
(74) *Attorney, Agent, or Firm* — Hanley, Flight and Zimmerman, LLC

(57) ABSTRACT

Example methods and systems to indicate the status of door operations are disclosed. An example door system includes a door panel having a leading edge to be moved in a travel direction between an open position and a closed position relative to the doorframe. The door panel to block the passageway when the leading edge is at the closed position. The door panel to unblock the passageway when the leading edge is at the open position. The example door system also includes a series of lights distributed along the travel direction proximate the doorframe. The example door system further includes a controller to switch the lights between a (Continued)

first state and a second state to provide a visual effect of movement corresponding to the operating status of the door system.

17 Claims, 11 Drawing Sheets

(51) Int. Cl.
  *E05F 15/668* (2015.01)
  *E05F 15/77* (2015.01)
  *E05F 15/78* (2015.01)
  *E05F 15/79* (2015.01)
  *H02J 7/00* (2006.01)
  *E06B 9/82* (2006.01)
  *G08B 5/36* (2006.01)
  *E05F 15/40* (2015.01)
  *E05F 15/73* (2015.01)

(52) U.S. Cl.
  CPC .............. *E05F 15/78* (2015.01); *E05F 15/79* (2015.01); *E06B 9/68* (2013.01); *E06B 9/82* (2013.01); *G08B 5/36* (2013.01); *H02J 7/0052* (2013.01); *E05F 2015/765* (2015.01); *E05Y 2400/30* (2013.01); *E05Y 2400/44* (2013.01); *E05Y 2900/11* (2013.01); *E06B 2009/6809* (2013.01); *E06B 2009/6818* (2013.01); *E06B 2009/6836* (2013.01)

(58) Field of Classification Search
  CPC ......... E05F 15/668; E05F 15/79; E05F 15/78; E05F 15/77; E05F 2015/765; E05Y 2900/11; G08G 1/168
  See application file for complete search history.

(56) References Cited

U.S. PATENT DOCUMENTS

| | | | |
|---|---|---|---|
| 5,260,919 | A | 11/1993 | Tsai |
| 5,412,297 | A | 5/1995 | Clark et al. |
| 5,413,128 | A | 5/1995 | Butts |
| 5,831,540 | A | 11/1998 | Sullivan et al. |
| 6,058,635 | A | 5/2000 | Morris |
| 6,469,464 | B1 | 10/2002 | McCall |
| 6,572,238 | B1 | 6/2003 | Johnson |
| 6,683,540 | B1 | 1/2004 | Harrison |
| 6,736,534 | B1 | 5/2004 | Fite |
| 6,894,613 | B2 | 5/2005 | Stab |
| 6,975,226 | B2 | 12/2005 | Reynard et al. |
| 7,024,819 | B1 | 4/2006 | Irvin et al. |
| 7,091,688 | B2 * | 8/2006 | Gioia ................... E06B 9/68 318/266 |
| 7,113,070 | B2 | 9/2006 | Deng et al. |
| 7,256,703 | B2 | 8/2007 | Duvernell et al. |
| 7,274,300 | B2 | 9/2007 | Duvernell et al. |
| 7,296,955 | B2 | 11/2007 | Dreier |
| 7,602,283 | B2 * | 10/2009 | John ..................... G08B 21/14 340/539.11 |
| 7,750,890 | B2 * | 7/2010 | Fitzgibbon ............ E05F 15/668 340/5.71 |
| 8,345,010 | B2 * | 1/2013 | Fitzgibbon ............ E05F 15/668 340/5.71 |
| 8,844,200 | B2 | 9/2014 | Yulkowski et al. |
| 9,830,825 | B2 * | 11/2017 | Anstett ................. G08G 1/168 |
| 2003/0075287 | A1 | 4/2003 | Weik, III |
| 2003/0145521 | A1 | 8/2003 | Moersch et al. |
| 2004/0210327 | A1 | 10/2004 | Robb |
| 2005/0140321 | A1 * | 6/2005 | Wojciak, Jr. ....... G07C 9/00182 318/452 |
| 2005/0261786 | A1 | 11/2005 | Eager et al. |
| 2006/0181391 | A1 | 8/2006 | McNeill et al. |
| 2007/0108927 | A1 | 5/2007 | Valencia et al. |
| 2007/0263413 | A1 | 11/2007 | Spira et al. |
| 2008/0022596 | A1 | 1/2008 | Boerger et al. |
| 2009/0071082 | A1 | 3/2009 | Van Der Kort et al. |
| 2011/0232192 | A1 | 9/2011 | Miller |
| 2012/0092125 | A1 * | 4/2012 | Farber ................. G07C 9/00111 340/5.7 |
| 2013/0009785 | A1 | 1/2013 | Finn et al. |
| 2013/0112354 | A1 * | 5/2013 | Hardison, III .......... E06B 9/581 160/127 |
| 2013/0127590 | A1 | 5/2013 | Braverman et al. |
| 2013/0186001 | A1 * | 7/2013 | Cui .......................... E06B 9/68 49/31 |
| 2014/0125499 | A1 | 5/2014 | Cate et al. |
| 2014/0190082 | A1 | 7/2014 | Sheldon |
| 2016/0013682 | A1 | 1/2016 | Ostendorf et al. |
| 2016/0040469 | A1 | 2/2016 | Lietz et al. |
| 2016/0298373 | A1 | 10/2016 | Lietz et al. |

FOREIGN PATENT DOCUMENTS

| | | |
|---|---|---|
| EP | 2215612 | 8/2012 |
| FR | 2853925 | 10/2004 |

OTHER PUBLICATIONS

European Patent Office, "European search report," issued in connection with European Patent Application No. 17020392.1, dated Nov. 14, 2017, 5 pages.

IP Australia, "Examination report No. 2," issued in connection with Australian Patent Application No. 2015301298, dated Jan. 31, 2018, 6 pages.

State Intellectual Property Office of China, "First Office Action," issued in connection with Chinese Patent Application No. 201580041995.9, dated Jan. 25, 2018, 16 pages.

International Searching Authority, "International Preliminary Report on Patentability," issued in connection with PCT Patent Application No. PCT/US2015/043567, dated Feb. 16, 2017, 20 pages.

IP Australia, "Examination Report No. 1," issued in connection with Australian Patent Application No. 2015301298, dated Aug. 16, 2017, 7 pages.

International Searching Authority, "Search Report", issued in connection with PCT patent application No. PCT/US2015/043567, dated Mar. 16, 2015, 8 pages.

International Searching Authority, "Written Opinion", issued in connection with PCT patent application No. PCT/US2015/043567, dated Mar. 16, 2015, 18 pages.

International Searching Authority, "Invitation to pay additional fees and, where applicable, protest fee", issued in connection with PCT patent application No. PCT/US2015/043567, mailed on Dec. 1, 2015, 11 pages.

United States Patent and Trademark Office, "Restriction and/or Election Requirement," issued in connection with U.S. Appl. No. 14/453,237, dated Dec. 21, 2015, 5 pages.

United States Patent and Trademark Office, "Non-Final Office Action," issued in connection with U.S. Appl. No. 14/453,237, dated Mar. 28, 2016, 35 pages.

Adafruit, "Led Matrix Panel", retrieved from the website www.adafruit.com/products/607, last visited on Aug. 4, 2014, 6 pages.

State Intellectual Property Office of China, "Second Office Action," issued in connection with Chinese Patent Application No. 201580041995.9, dated Nov. 26, 2018, 8 pages.

European Patent Office, "Intention to Grant," issued in connection with European Patent Application No. 17020392.1, dated Jul. 19, 2018, 33 pages.

United States Patent and Trademark Office, "Non-Final Office Action" issued in connection with U.S. Appl. No. 15/187,503, dated Jun. 7, 2018, 7 pages.

IP Australia, "Notice of Acceptance," issued in connection with Australian Patent Application No. 2015301298, dated Jun. 6, 2018, 4 pages.

New Zealand Intellectual Property Office, "First Examination Report," issued in connection with New Zealand Patent Application No. 728593, dated Jul. 24, 2018, 4 pages.

(56) References Cited

OTHER PUBLICATIONS

IP Australia, "Examination Report No. 1," issued in connection with Australian Patent Application No. 2018200505, dated Aug. 8, 2018, 5 pages.

IP Australia, "Examination Report No. 1," issued in connection with Australian Patent Application No. 2018201028, dated Aug. 8, 2018, 4 pages.

IP Australia, "Examination Report No. 2," issued in connection with Australian Application No. 2018201028, dated Feb. 26, 2019, 4 pages.

Haas Automation, Inc., "Mill Operator's Manual: 96-8000 Rev AP," Dec. 2012, 314 pages.

United States Patent and Trademark Office, "Final Office action," issued in connection with U.S. Appl. No. 15/187,503, on Feb. 4, 2019, 22 pages. (Copy not provided as this is a USPTO document. Applicant will provide upon request by Examiner.).

European Patent Office, "European Search Report," issued in connection with European Application No. 18208599.3, dated Mar. 26, 2019, 7 pages.

\* cited by examiner

METHODS AND SYSTEMS TO INDICATE THE STATUS OF DOOR OPERATIONS

RELATED APPLICATIONS

This patent is a continuation of U.S. patent application Ser. No. 15/187,503, which was filed on Jun. 20, 2016, and claims priority to U.S. patent application Ser. No. 14/453,237, which was filed on Aug. 6, 2014. U.S. patent application Ser. Nos. 15/187,503 and 14/453,237 are incorporated herein by reference in their entireties.

FIELD OF THE DISCLOSURE

The present disclosure relates generally to doors and more specifically to methods and systems to indicate the status of door operations.

BACKGROUND

A variety of power-operated doors have movable door panels for selectively blocking and unblocking a passageway through a doorway. Door panels come in various designs and operate in different ways. Examples of some door panels include a rollup panel (e.g., pliable or flexible sheet), a rigid panel, a flexible panel, a pliable panel, a vertically translating panel, a horizontally translating panel, a panel that translates and tilts, a swinging panel, a segmented articulated panel, a panel with multiple folding segments, a multilayer thermally insulated panel, and various combinations thereof.

Some power-operated doors have audio or visual signaling systems that indicate various conditions pertaining to the door or nearby area. Examples of such systems are disclosed in U.S. Pat. No. 4,821,024; U.S. published patent application 2013/009785 A1; and US published patent application 2008/0022596 A1; all of which are specifically incorporated by reference herein.

DETAILED DESCRIPTION

Figure 1:
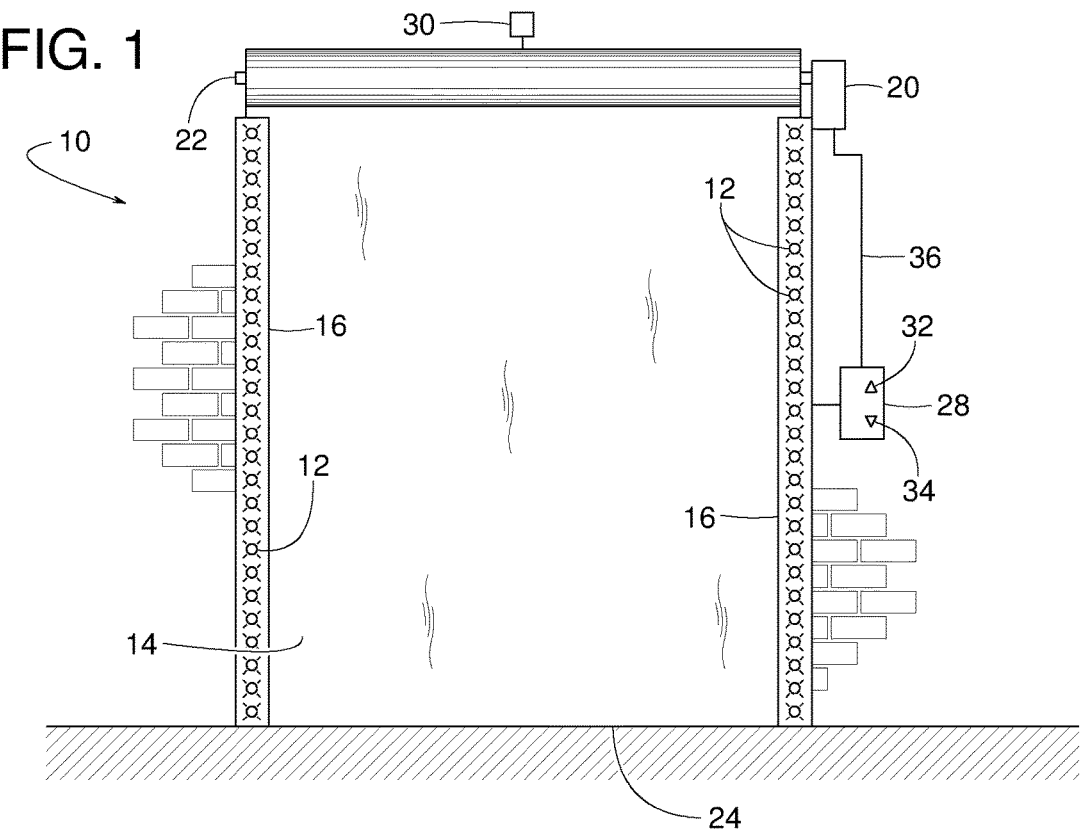
FIG. 1 is a front view of an example door system constructed in accordance with the teachings disclosed herein.
Figure 2:
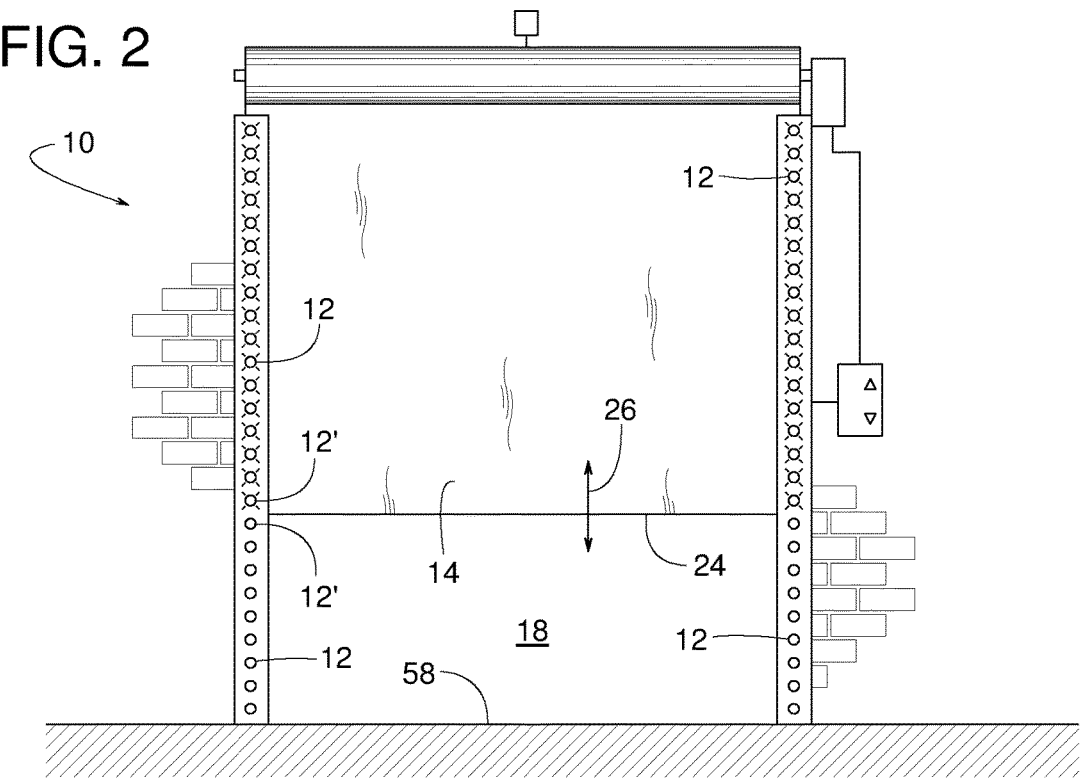
FIG. 2 is a front view similar to FIG. 1 but showing the example door about one-third open.
Figure 3:
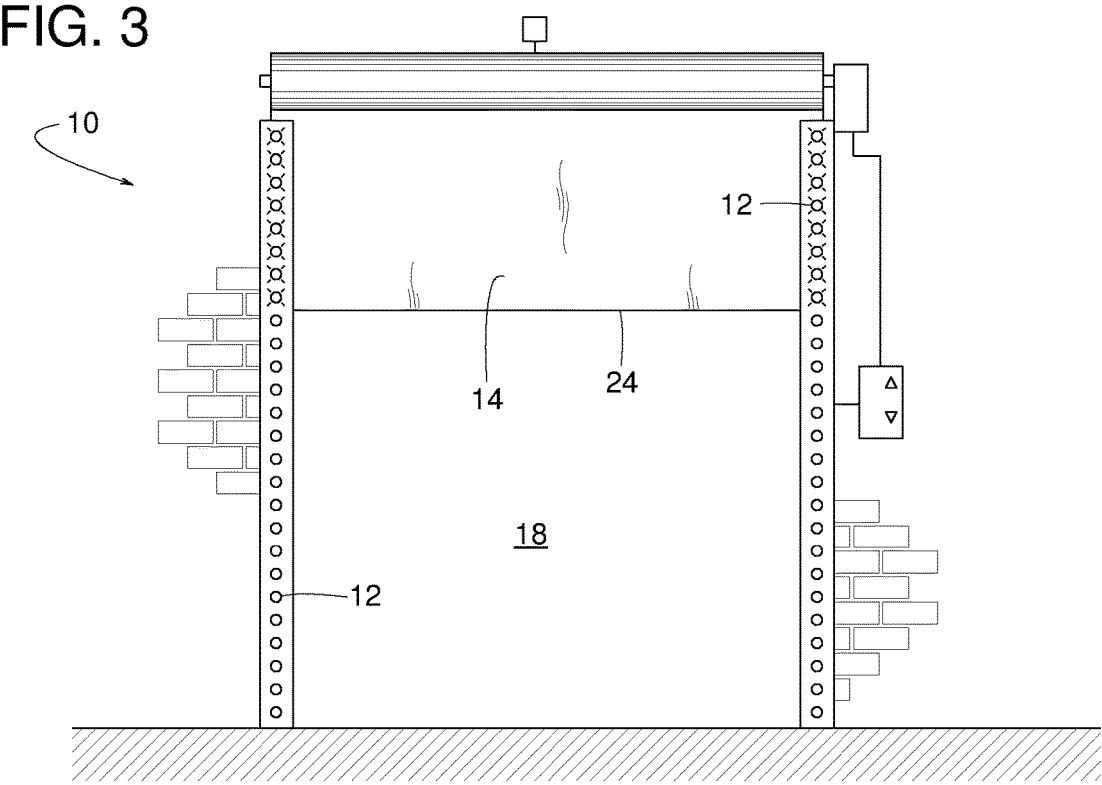
FIG. 3 is a front view similar to FIG. 1 but showing the example door about two-thirds open.
Figure 4:
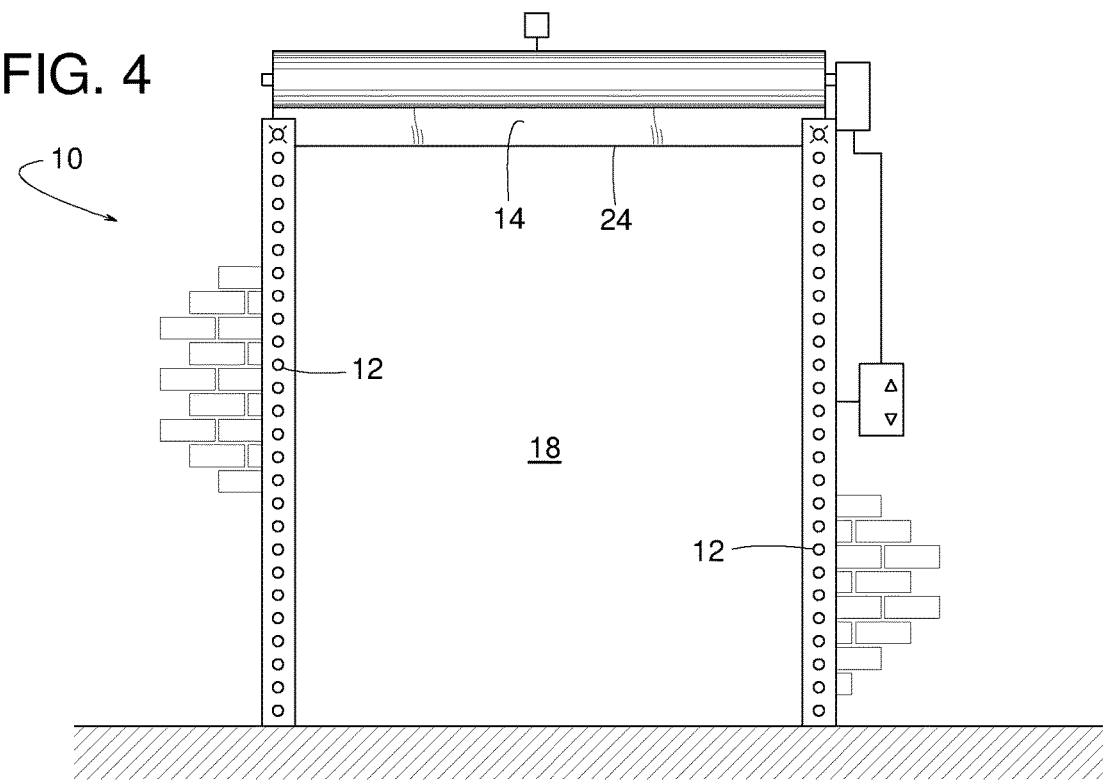
FIG. 4 is a front view similar to FIG. 1 but showing the example door fully open.
Figure 5:
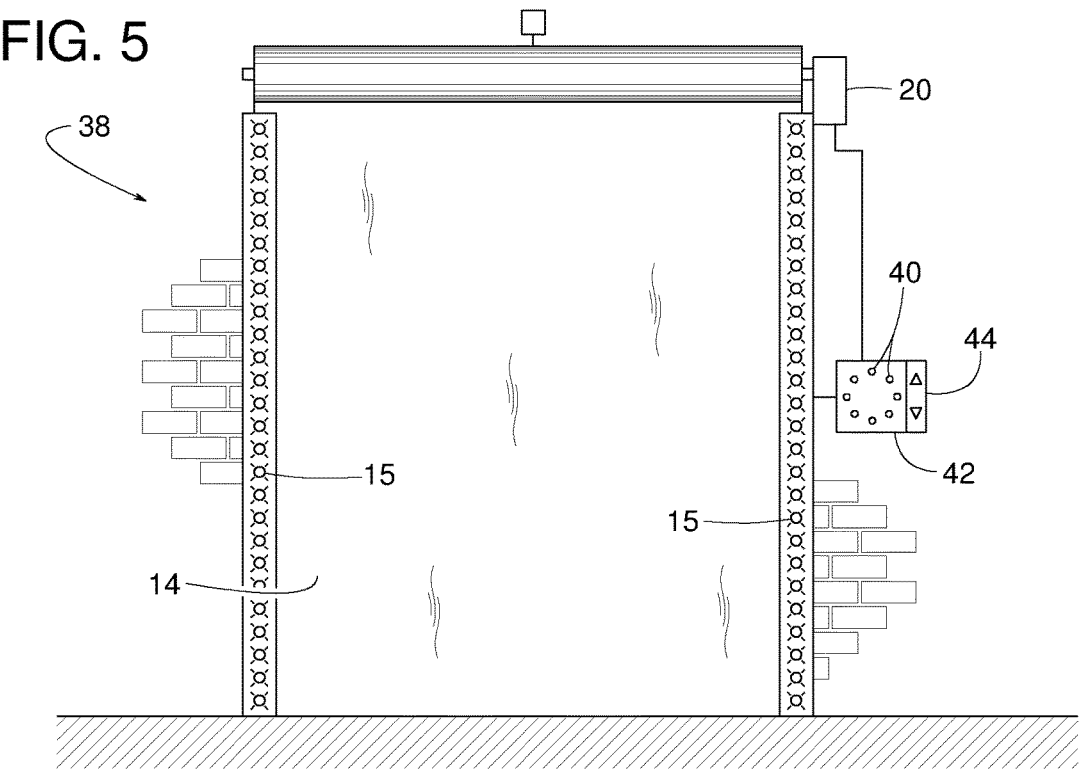
FIG. 5 is a front view of another example door system constructed in accordance with the teachings disclosed herein.
Figure 6:
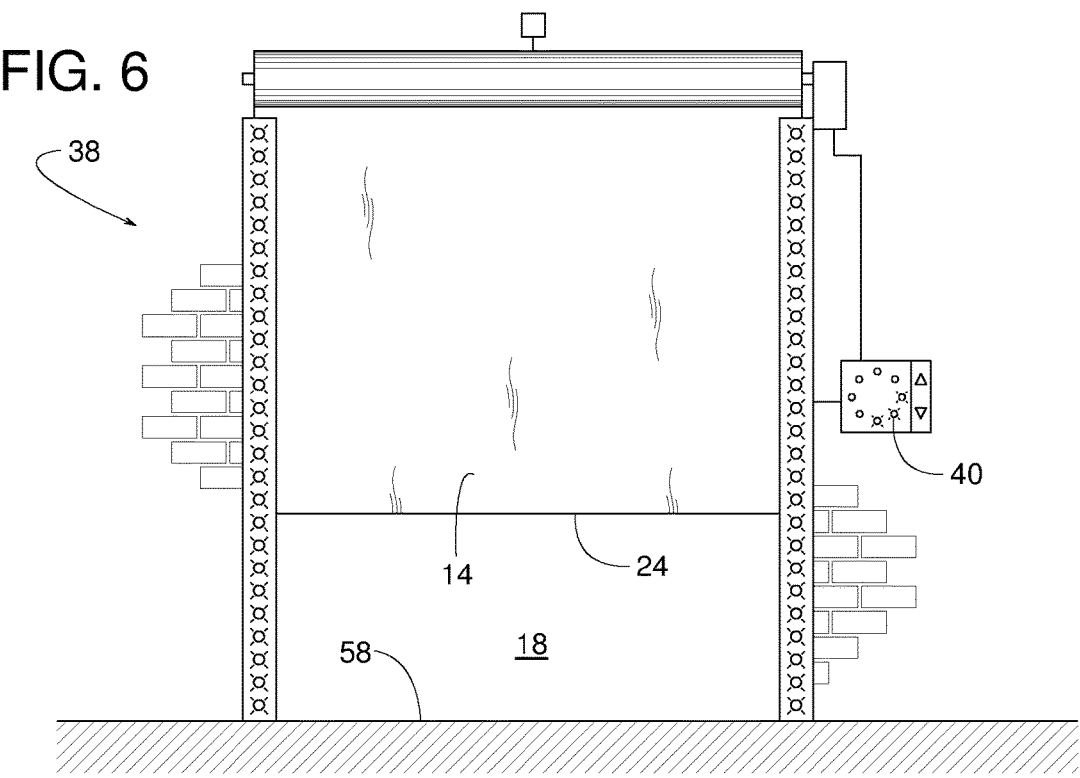
FIG. 6 is a front view similar to FIG. 5 but showing the example door about one-third open.
Figure 7:
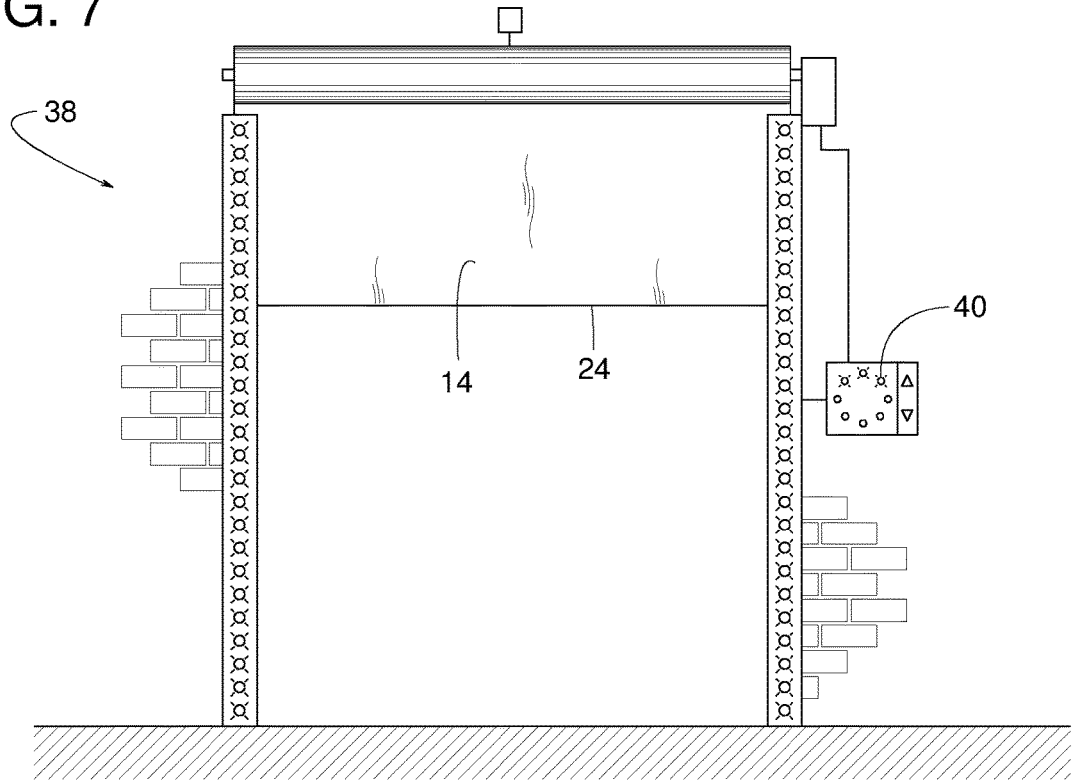
FIG. 7 is a front view similar to FIG. 5 but showing the example door about two-thirds open.
Figure 8:
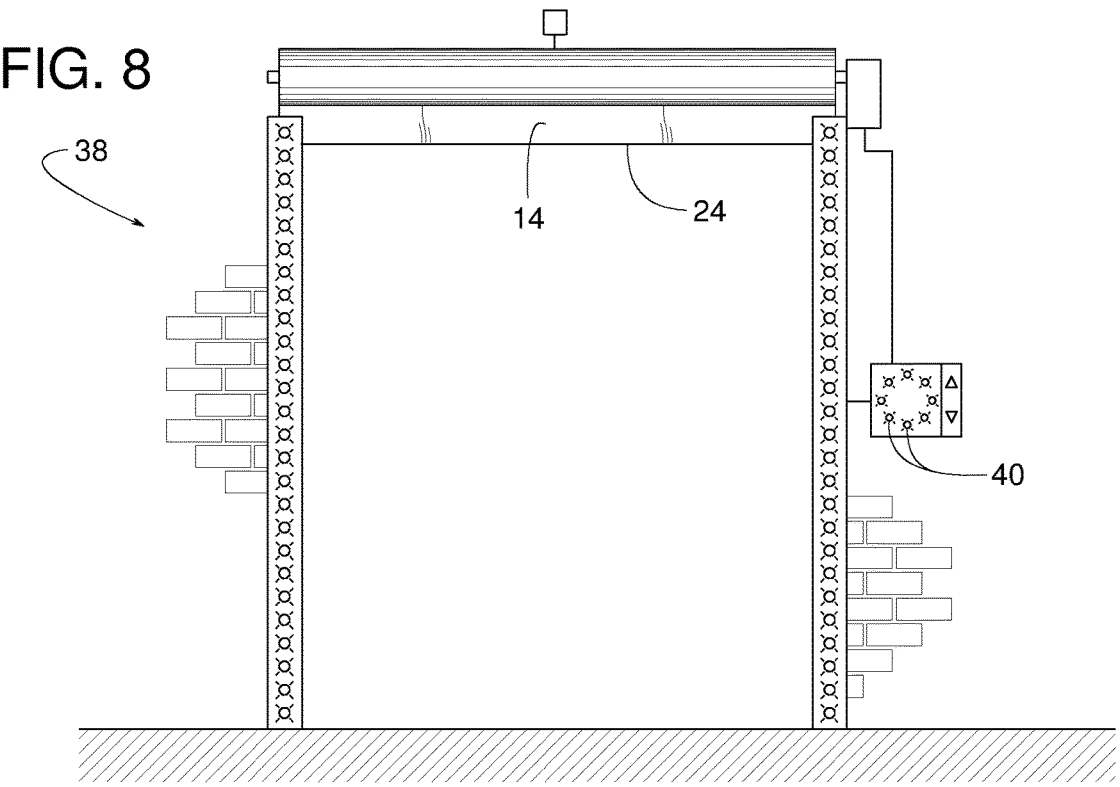
FIG. 8 is a front view similar to FIG. 5 but showing the example door fully open.

Example methods and apparatus disclosed herein provide visual signals on, alongside, or otherwise proximate to a movable door panel. Some such example methods and apparatus include lights that provide a visual effect of movement (e.g., via animation techniques) coinciding with a travel direction of a door panel's leading edge. In some examples, lights are placed on a door's control box. In some examples, a battery or super-capacitor is disposed on a door panel to provide portable electrical power to a series of lights installed along the door panel's movable leading edge. In some examples, the lights provide various signals indicating a door is about to open due to impending completion of a work-in-process behind the door. In some examples, a portion of the door is made of a thermochromic material and/or changes color in response to the temperature of the door.

FIGS. 1-20 show various example door systems which provide visual signals indicating the operating status of the door and/or conditions on the other side of the door. Example visual signals include (1) sequentially activated variable state lights to generate a visual effect of movement along a doorframe and/or on a control box, (2) lights disposed on and moving with the leading edge of a door panel, (3) a light projected on a door panel, and/or (4) a thermochromic area on a doorframe or on a moving door panel. Example operating statuses of the door include the door opening, the door closing, the door being about to open, and/or the door being about to close. Example conditions on the other side of the door include temperature, humidity, the presence of a person or object, and impending completion of a manufacturing process on the other side of the door.

FIGS. 1-4 show an example door system 10 having a series of lights 12 (plurality of lights) that are controlled to provide a visual effect of movement that indicates movement of a door panel 14 and/or indicates impending movement of the door panel 14. That is, while individual lights in the series of lights 12 in the illustrated example are at fixed locations, the controlled activation/deactivation of individual (e.g., successive) ones of the series of lights 12 gives the appearance of a light signal moving along the series of lights 12. The term, "door panel" represents any structure that is moveable to selectively block and unblock a passageway (e.g., a doorway or other access opening). Example door panels include a rollup panel (e.g., pliable or flexible sheet), a rigid panel, a flexible panel, a pliable panel, a vertically translating panel, a horizontally translating panel, a panel that translates and tilts, a swinging panel, a segmented articulated panel, a panel with multiple folding segments, a multilayer thermally insulated panel, and various combinations thereof.

The term, "light" refers to any one or more elements providing illumination or one or more surfaces. Examples of a light include a single illuminating element (e.g., an LED, light bulb, etc.), a single illuminating element of a single color, a single illuminating element functional to provide selectively different colors, multiple discrete illuminating elements, multiple illuminating elements of a single color, multiple illuminating elements of different colors, one or more light emitting diodes (LEDs), a rope light comprising a series of LEDs, one or more incandescent bulbs, and a target surface illuminated by a projector (or other light source) through air or through light-passing material (e.g., fiber optics).

In the particular example shown in FIGS. 1-4, the door system 10 comprises a doorframe 16 proximate a passageway 18, the door panel 14 (rollup style in the illustrated example), and the series of lights 12 distributed along the doorframe 16. To open and close the door system 10, a drive unit 20 rotates a take-up drum 22 that draws the door panel 14 up or pays it out to selectively move a leading edge 24 of the panel 14 in a travel direction 26 between an open position (FIG. 4) and a closed position (FIG. 1). The doorframe 16 helps guide the lateral edges of the panel 14 as the door system 10 opens and closes. Some examples of the door panel 14 include a seal along its leading edge 24.

In some examples, a controller 28 and/or a sensor 30 controls the operation of the door system 10. For instance, in some examples, the controller 28 includes a manually operated open button 32 and a close button 34 that initiate the conveyance of an output signal 36 to drive unit 20 for opening and closing the door system 10. The term, "controller" refers to any device for directing, determining, commanding, regulating or otherwise controlling the door's operation.

In addition or alternatively, in some examples, the sensor 30 triggers the opening or closing of the door system 10 depending on whether the sensor 30 detects the presence or movement of a body near the door system 10. In some examples, the sensor 30 is part of the controller 28. The term, "sensor" refers to any device for providing a trigger or feedback signal in response to detecting the presence or movement of a body (e.g., a person, vehicle, obstacle, etc.). Sensors detecting presence or movement operate under various known principles, examples of which include active infrared, passive infrared, ultrasonic, radar, microwave, laser, electromagnetic induction, pressure pad, ultra-IR LED, time-of-flight pulse ranging technology, photoelectric eye, thermal, video camera, video analytics, and various combinations thereof.

In some examples, the controller 28 also controls the lights 12 in such a way as to provide a visual indication of the door's operation. The visual indication can warn those in the vicinity of the door system 10 that the door panel 14 is opening, about to open, closing or about to close. In some examples, each discrete light of the series of lights 12 is individually switchable selectively to a first state and a second state. Examples of first and second states of any given light 12 include on and off, energized and de-energized, red and green, color-1 and color-2, bright and dim, steady and flashing, etc.

The lights 12, in some examples, are switched in a certain pattern such that lights 12 provide a visual effect of movement in the travel direction 26 of the leading edge 24 of the door panel 14. For instance, in some examples, individual ones of the lights 12 change between their first and second states in substantial synchrony with the traveling movement of the leading edge 24 of the door panel 14. With such a synchronous control scheme, a light signal generated by the lights 12 appears to travel at substantially the same velocity (e.g., within 10% of the actual velocity) as the leading edge 24 of the door panel 14 and/or appears to travel at substantially the same elevation (e.g., within one foot of the actual elevation) of the leading edge 24.

More specifically, in the illustrated example, when the door panel 14 is moving or is about to move, the lights 12 above the leading edge 24 are energized and the lights 12 below the leading edge 24 are de-energized. In other words, a given light 12' adjacent to the leading edge 24 changes state as the leading edge 24 passes the position of the light 12'. Consequently, all the lights 12 are turned on when the door system 10 is fully closed, as shown in the illustrated example of FIG. 1. When the door system 10 is about one-third open, as shown in the illustrated example of FIG. 2, the upper two-thirds of the lights 12 are energized, and the lower third are de-energized. When the door system 10 is about two-thirds open, as shown in the illustrated example of FIG. 3, the upper third of the lights 12 are energized while the lower two-thirds are de-energized. When the door system 10 is fully open, as shown in the illustrated example of FIG. 4, all or nearly all of the lights 12 are de-energized. In other examples, all or nearly all of the lights 12 are energized when the door system 10 is fully open while the lights 12 are de-energized when the door system 10 is fully closed.

Some examples of door system 10 include additional or alternative control schemes. In some examples, the lights 12 are controlled to provide a visual effect of movement having a greater or slower speed as that of the leading edge 24 but with the same travel direction (e.g., up and down, left and right, or some other two directions of movement). This provides the benefit of not having to coordinate the travel speed indicated by the visual effect of movement generated by the lights 12 with the actual movement of the door panel 14. In some examples, the visual effect of movement has a speed that varies to represent different conditions (e.g., actual door movement vs. impending door movement). In some examples, when the door panel 14 is moving or is about to move, the lights 12 above the leading edge 24 are one color and the lights 12 below the leading edge 24 are a different color. This creates a visual effect of movement while maintaining the full length of the series of lights 12 lit to help illuminate the passageway 18.

In some examples, the lights 12 provide selectively a first signal and a second signal that are distinguishable from each other by virtue of some characteristic such as different colors, flashing vs. continuous, different flashing frequencies, different flashing patterns, and different brightness. The distinguishable characteristic can be used for indicating different operating conditions, such as actual door movement and impending door movement.

Referring to FIGS. 5-8, as an addition or alternative to the lights 12 distributed along the doorframe 16, a door system 38 has a plurality of lights 40 borne by an enclosure 42 of a controller 44. Similar to the lights 12 of FIGS. 1-4, the lights 40 are individually switchable between first and second states in a pattern that provides a visual effect of movement related to the operation of the door system 38. When the lights 40 are distributed in a circular layout, as shown in the illustrated example of FIGS. 5-8, the visual effect of movement is rotational. In examples where the lights 40 are distributed in a linear layout on the enclosure 42, the visual effect of movement is linear. Similar to the lights 12 of FIGS. 1-4, the lights 40 can be controlled in various ways, examples of which include visually representing clockwise rotational movement, visually representing counterclockwise rotational movement, visually representing horizontal movement, visually representing vertical movement, varying an apparent speed of the visually represented movement, selectively flashing a some or all of the lights simultaneously, individual discrete lights selectively energized and de-energized, individual discrete lights selectively switched between different colors, different signals indicating door movement or impending door movement, and various combinations thereof.

In some examples, an appreciable length of the doorframe 16 is made of a light transmitting material (e.g., a clear material, a translucent material, and combinations thereof). In such examples, one or more lights 15 project one or more light beams through the doorframe 16 itself. In some examples, a single light 15 at an upper or lowered end of the doorframe 16 projects a light beam vertically through the doorframe 16 to illuminate all or at least much of the doorframe's length.

Figure 9:
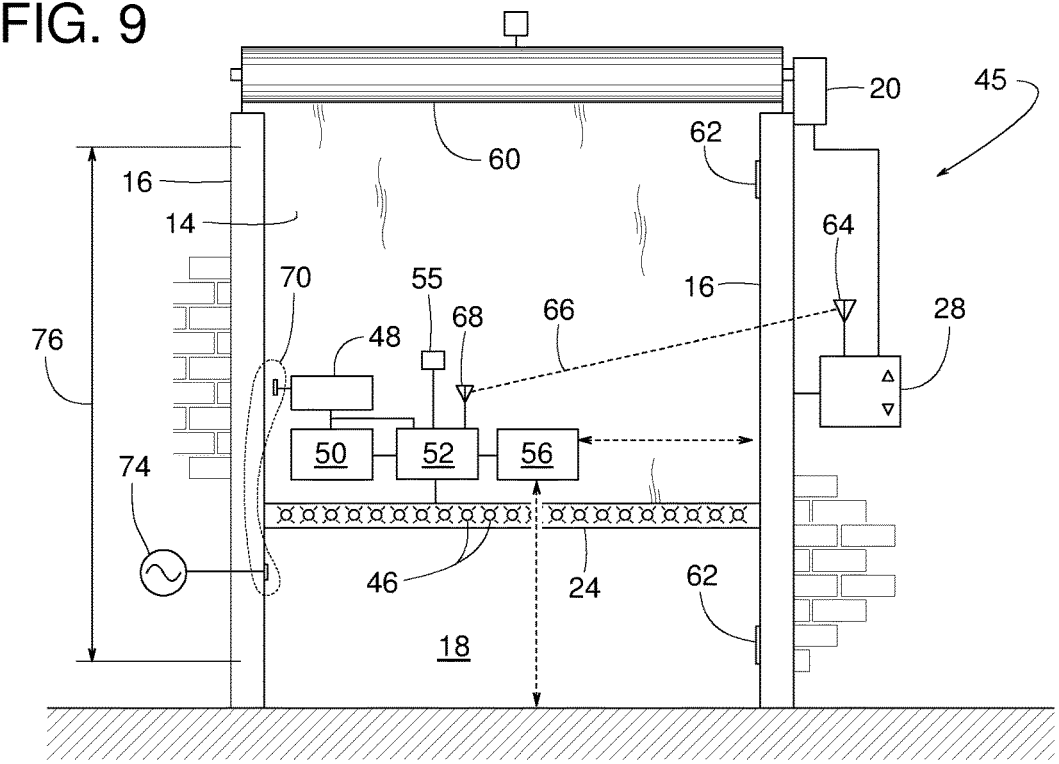
FIG. 9 is a front of another example door system constructed in accordance with the teachings disclosed herein. Some electronic portions are shown schematically.
Figure 10:
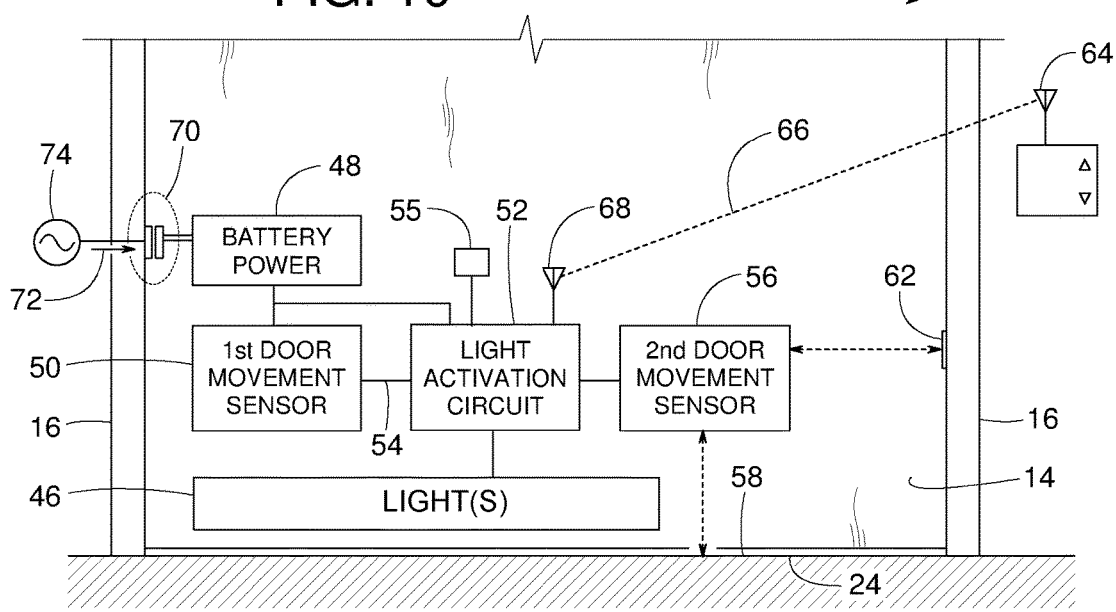
FIG. 10 is an enlarged partial front view of the example door system of FIG. 9 but with the example door fully closed.

FIGS. 9 and 10 show an example door system 45 that includes at least one light 46 installed along the leading edge 24 of the door panel 14. In the illustrated example, the light(s) 46 not only highlights the panel's impact-vulnerable leading edge 24 but, in some examples, also provides various visual signals that indicate the operating status of the door system 45. To avoid the difficulty and expense of having to run electrical power from an external stationary power source to the light(s) 46 on the moving panel 14, in some examples, the door system 45 includes a power storage unit 48 (e.g., battery, capacitor, super-capacitor, etc.) mounted to the panel 14 so that both the power storage unit 48 and the light(s) 46 generally travel together.

To prolong the power storage life of the power storage unit 48, the door system 45 includes means for minimizing power consumption. In some examples, the means for reducing power consumption involves the door panel 14 carrying a door movement sensor 50 and a light activation circuit 52. Upon sensing door panel movement, the sensor 50 sends a trigger signal 54 to the light activation circuit 52. In response to the trigger signal 54, the light activation circuit 52 switches from a reduced-power sleep mode to an active mode. In the active mode, the circuit 52 activates the light(s) 46 to illuminate the leading edge 24 of the door panel 14. So, in some examples, the light(s) 46 are normally off but turn on when the panel 14 is moving to open or close the door system 45.

In some examples, the door movement sensor 50 is an extremely low power component and, in some examples, it is the only fully active electrical component on the panel 14 when the door system 45 is not in use (e.g., not being opened or closed). Although the light activation circuit 52 in the active mode consumes more power than the sensor 50, the light activation circuit 52 is only in its active mode when needed to activate the light(s) 46. Examples of electrical circuits switchable between active modes and low power sleep modes are well known to those of ordinary skill in the art. Examples of the door movement sensor 50 include an accelerometer and a micro-electromechanical machine pressure transducer (MEMS).

Examples of the light(s) 46 include a single illuminating element (e.g., an LED, light bulb, etc.), a single illuminating element of a single color, a single illuminating element functional to provide selectively different colors, multiple discrete illuminating elements, multiple illuminating elements of a single color, multiple illuminating elements of different colors, one or more light emitting diodes (LEDs), a rope light comprising a series of LEDs, one or more incandescent bulbs, and one or more devices employing principles of fiber optics.

To avoid problems caused by intermittent or false trigger signals 54 from the sensor 50, some examples of the door system 45 further include a door operation sensor 56, which is schematically illustrated to represent any device that can confirm the movement or position of the door panel 14. To conserve power, some examples of the door operation sensor 56 are inactive until the light activation circuit 52 or the door movement sensor 50 triggers it to operate. When operating and confirming that the door panel 14 is either actually moving or is neither fully open nor fully closed, the door operation sensor 56 commands the light activation circuit 52 to keep the light(s) 46 energized regardless of any trigger signal 54 or lack of signal 54 from the door movement sensor 50. In some examples, the door operation sensor 56 is a motion sensor (e.g., passive infrared, laser, optical, ultrasonic, etc.) that detects relative motion between the sensor 56 and a floor 58, or detects relative motion between the sensor 56 and some other convenient target surface (e.g., ceiling, the doorframe 16, an overhead surface 60 of the door system 45, etc.).

In some examples, the door operation sensor 56 is directed laterally to detect one or more reflectors 62 attached to the doorframe 16. Upon detecting one of the reflectors 62, the sensor 56 can determine that the panel 14 is either fully open or closed. That information in combination with a lack of the trigger signal 54 would strongly indicate that door panel 14 is not moving, and thus, the light(s) 46 can be turned off. If the reflectors 62 are not in view of the sensor 56 in the illustrated example, that would indicate the door panel 14 is moving or has paused between the door panel's fully open and fully closed positions, and thus, the light(s) 46 should be energized.

In addition or alternatively, to confirm actual door panel movement, some examples of the door system 45 include a wireless transmitter 64 associated with the controller 28 or the drive unit 20. A wireless communication link 66 connects the transmitter 64 in wireless communication with a wireless receiver 68 associated with the light activation circuit 52. The communication link 66 conveys information from the drive unit 20 and/or from the controller 28, wherein the information indicates whether the door panel 14 is moving, fully closed, fully open or at some partially open position. To conserve energy, the light activation circuit 52 and the wireless receiver 68 remain generally inactive until the trigger signal 54 from the door movement sensor 50 switches the light activation circuit 52 from its sleep mode to its active mode. That is, in some examples, the light activation circuit 52 and the wireless receiver 68 disregard wireless signals transmitted via the communication link 66 when the light activation circuit 52 is in the sleep mode. In some examples, once the light activation circuit 52 is switched to the active mode (based on the trigger signal 54), the wireless signal from the transmitter 64 maintains the light activation circuit 52 in the active mode (e.g., until the trigger signal 54 and the wireless signal indicate the door panel is no longer moving).

In some examples, a charging system 70 periodically (or aperiodically) recharges the power storage unit 48 automatically when the door panel 14 is fully closed, fully open or at some other charging position. When the leading edge 24 of the door panel 14 is at the charging position, as shown in the illustrated example of FIG. 10, the charging system 70 conveys a charging power 72 from an external power source 74 to recharge the power storage unit 48. When the leading edge 24 of the door panel 14 is not at the charging position, the leading edge 24 may be within a range of self-powered positions 76, as shown in the illustrated example of FIG. 9. When the leading edge 24 is within the range of self-powered positions 76 (i.e., not in the charging position), the charging system 70 inhibits the charging power 72 from reaching the power storage unit 48. In such examples, the stored charge in the power storage unit 48 is what powers the light(s) 46 as the door opens and closes.

The charging system 70 is schematically illustrated to represent any separable electrical coupling between the power storage unit 48 and the external power source 74. Examples of the charging system 70 include an inductive coupling, a mating electrical plug and receptacle, and an electrically conductive brush with an associated electrical contact surface.

In some examples, the charging system 70 is an inductive coupling that, when the door system 45 is closed, recharges a super-capacitor form of the power storage unit 48. Super-capacitors charge relatively quickly, which is an important feature with doors that are operated frequently. Some batteries take longer to charge but can store more energy, so rechargeable batteries can work well with doors that have extended periods of use and extended periods of non-use. For instance, a battery form of power storage unit 48 might be useful for doors that are extremely busy during the day but are left closed for most of the night, whereby the battery can be recharged with enough power during the night to meet all of the power needs for the next day.

Some examples of door system 45 include an ambient light sensor 55. In response to input from the light sensor 55, the light activation circuit 52 adjusts the power to the light(s) 46. To conserve power and prolong the life of the power storage unit 48, the light activation circuit 52 delivers less power to the light(s) 46 during low ambient light conditions and delivers more power during high ambient light conditions.

FIGS. 11-16 show an example door system 78 for separating a personnel area 80 from a work area 82. In the illustrated example, a machine tool 84 is shown performing a work-in-process in the work area 82 such as machining a part 86 or performing some other process (e.g., assembling, mixing, painting, heating, forming, cleaning, welding, sorting, etc.). A machine tool operator 88 is shown in the personnel area 80, and a closed door panel 14 shields the operator 88 from the work as it is being performed between a start time and a completion time of the work-in-process. Upon completion of the work, a controller 90 commands the drive unit 20 to move a leading edge 24 of the door panel 14 from a closed position 92 to an open position 94 to unblock a passageway 96 (FIG. 16) between the work area 82 and the personnel area 80.

In some examples, the controller 90 is a door controller 98 for the door panel 14 of the door system 78 and is separate from a machine controller 102 of the machine tool 84. The term, "door controller" refers to a device dedicated to the operation of a door and not to any machine being shielded by the door. The term, "machine controller" refers to a device primarily meant for commanding the operation of a process other than just opening or closing a door. In some examples, the controller 90 is a combination of both the door controller 98 and the machine controller 102.

In some examples, the controller 90 commands the door system 78 to emit a first signal 100 from one or more signal generators (e.g., an audio speaker, a light source, etc.) that notifies the operator 88 when the door system 78 will be opening soon due to the work-in-process nearing completion or the work-in-process being within a predetermined period prior to completion. This provides the operator 88 with some time to prepare for the next job or least prepare for attending to the current one prior to the door system 78 opening. In some examples, when the work-in-process is completed, the controller 90 commands the door system 78 to open automatically in response to a job-complete feedback 104 from the machine controller 102 to the door controller 98.

Figure 14:
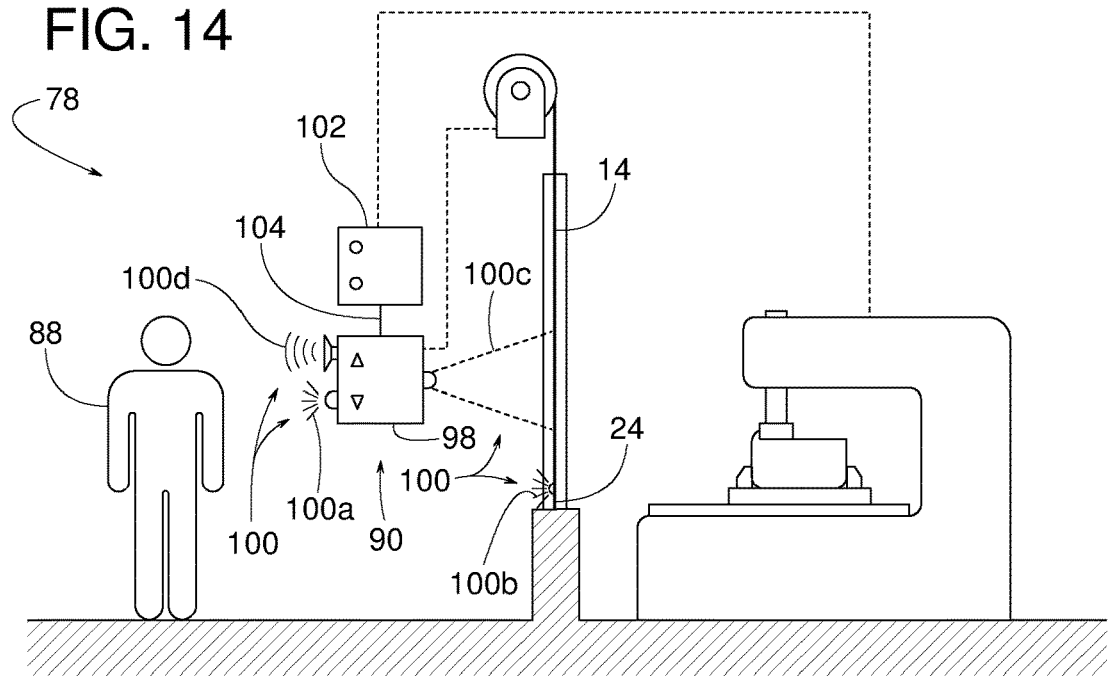
FIG. 14 is a side view similar to FIG. 13 but showing the example work-in-process nearly complete.

In some examples, the first signal 100 occurs closer to the process's completion time than to its start time. Examples of the first signal 100 include an audible signal and/or a visual signal. Referring to FIG. 14, more specific examples of the first signal 100 include one or more lights (similar to the lights 12 of FIG. 1) distributed along the doorframe 16 of the door system 78, the controller 90 emitting a light (first signal 100a), a leading edge 24 of the door panel 14 emitting a light (first signal 100b), the controller 90 projecting (e.g., via a light projector or other light source) onto the door panel 14 a light or image (first signal 100c), and the controller 90 emitting (e.g., via a speaker) a sound (first signal 100d). In some examples, the first signal 100c is a projected image of a clock or countdown timer that indicates the amount of time before the door system 78 will begin opening and/or the amount of time before the work-in-process will be completed. Additionally, or alternatively, in some examples, the first signals 100a, 100b may be adapted to indicate the time associated with such a clock or countdown timer.

Figure 16:
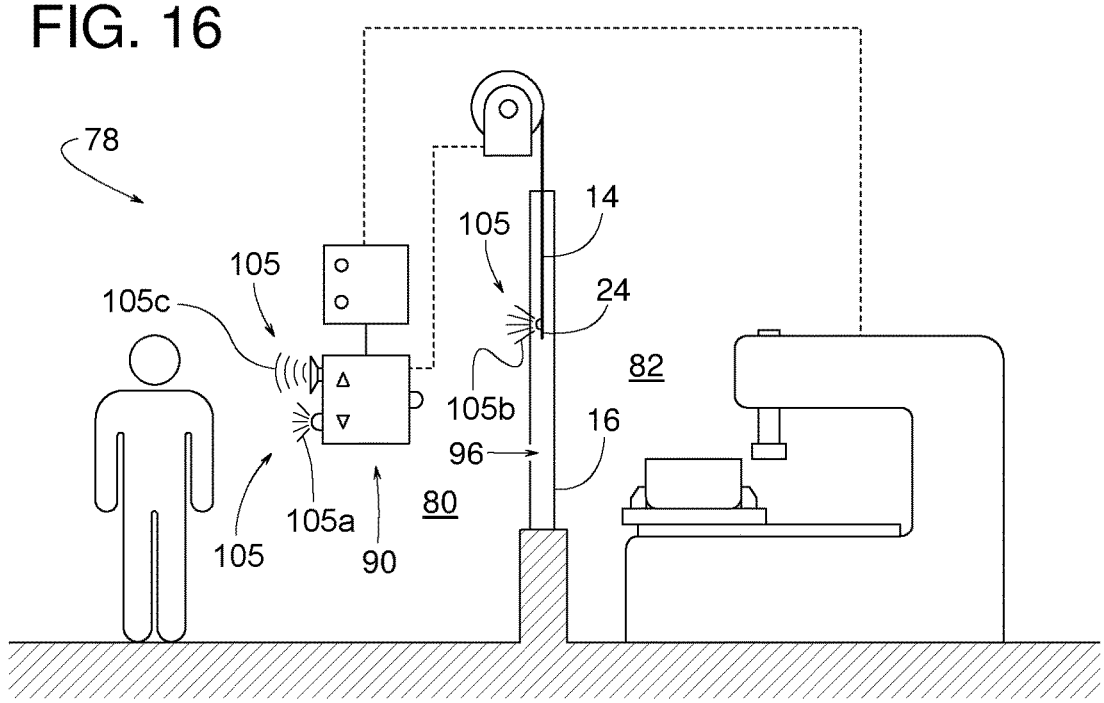
FIG. 16 is a side view similar to FIG. 11 but showing the example work-in-process complete and the example door opening.

In addition or alternatively, in some examples, the door system 78 emits a second signal 105 that indicates the door panel 14 is actually moving, as shown in FIG. 16. Examples of the second signal 105 include an audible signal and/or a visual signal. An audible version of the second signal 105 can be at any convenient location. Example locations of visual versions of the second signal 105 include on the controller 90, on the door panel 14, on the doorframe 16, etc. Referring to FIG. 16, specific examples of the second signal 105 include one or more lights (similar to the lights 12 of FIG. 1) distributed along the doorframe 16, the controller 90 emitting a light (second signal 105a), the leading edge 24 emitting a light (second signal 105b), and the controller 90 emitting a sound (second signal 105c). In some examples, the first signal 100 and the second signal 105 are distinguishable from each other by virtue of some characteristic such as different colors, flashing vs. continuous, audible vs. visual, different flashing frequencies, different flashing patterns, different locations (e.g., on doorframe 16 and on leading edge 24), and different levels of brightness.

Figure 11:
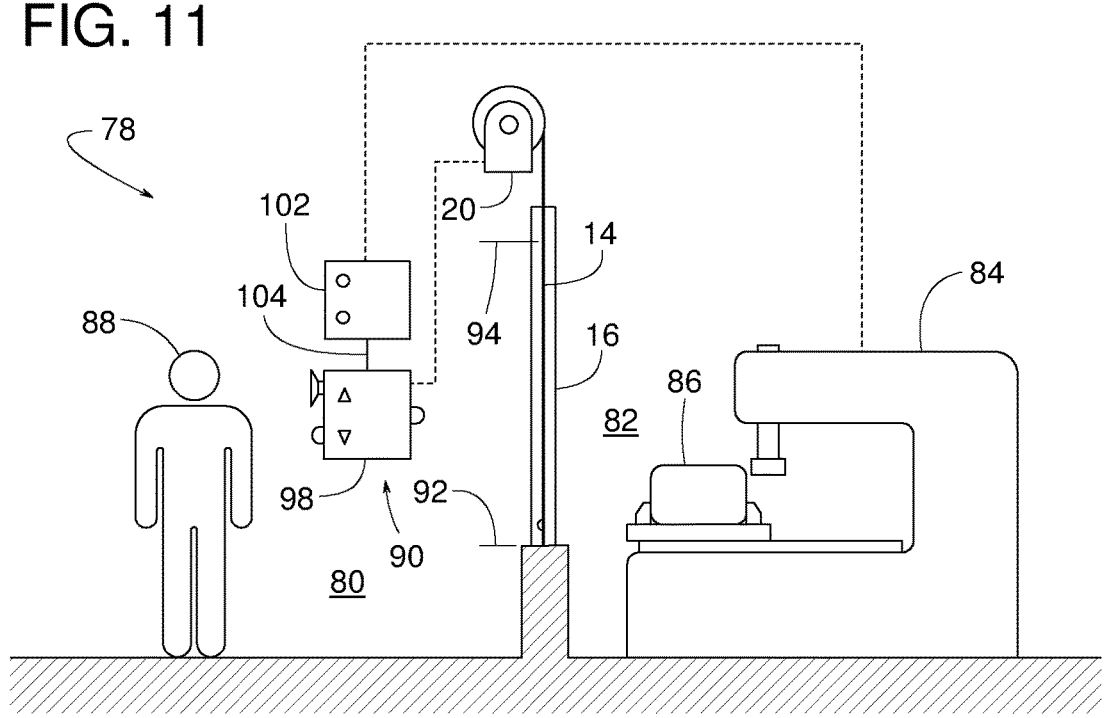
FIG. 11 is a side view of another example door system constructed in accordance with the teachings disclosed herein.
Figure 12:
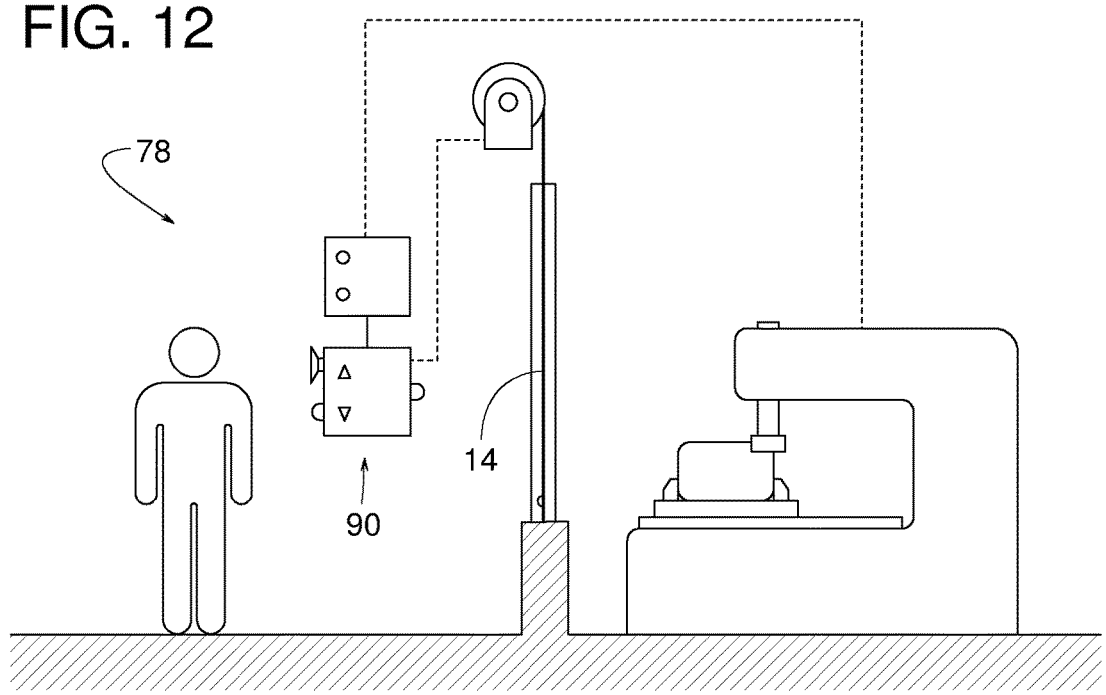
FIG. 12 is a side view similar to FIG. 11 but showing an example work-in-process near its start time.
Figure 13:
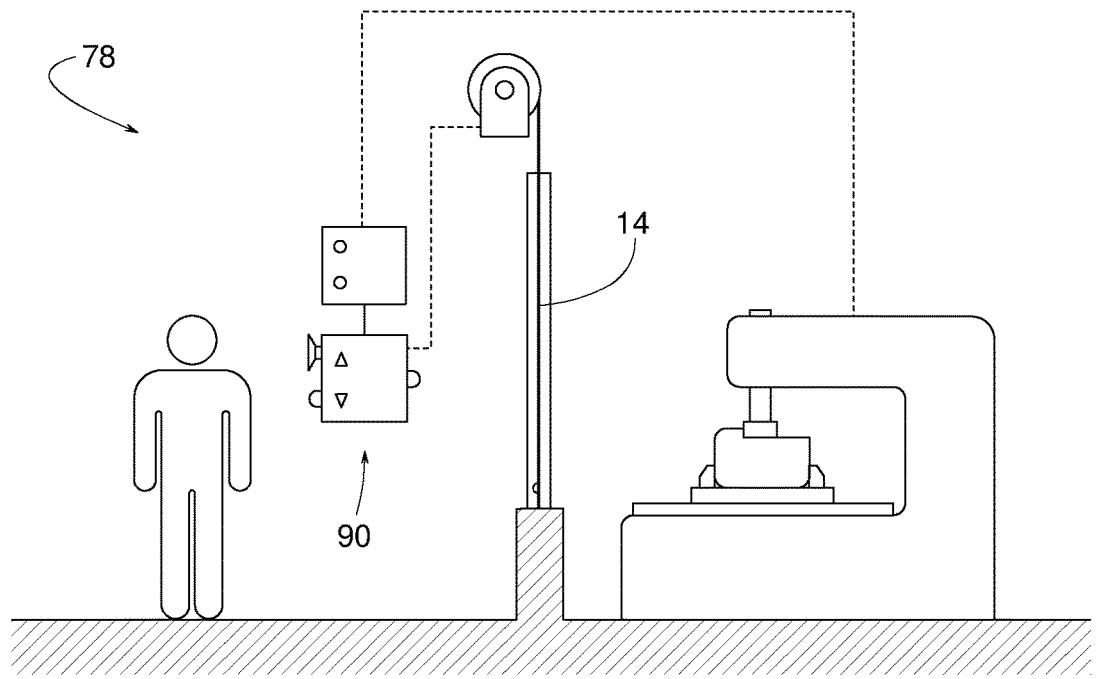
FIG. 13 is a side view similar to FIG. 12 but showing the example work-in-process further along.
Figure 15:
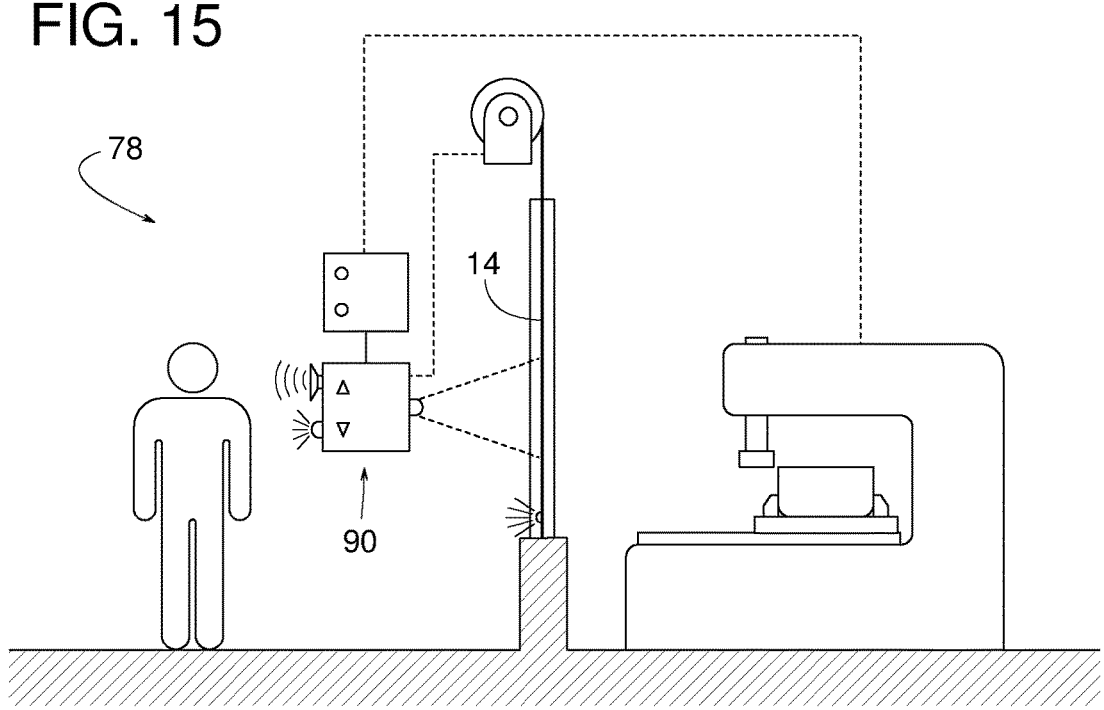
FIG. 15 is a side view similar to FIG. 14 but showing the example work-in-process at completion.

One example operation of the door system 78 is as shown in FIGS. 11-16 sequentially. FIG. 11 shows the door system 78 closed with the work-in-process about to begin. FIG. 12 shows the work-in-process having already started. FIG. 13 shows further progress of the work-in-process. FIG. 14 shows the emitting of the first signal 100 (e.g., at least one of the first signals 100a, 100b, 100c, 100d) as an indication that the work-in-process is nearly complete. FIG. 15 shows the work-in-process at completion. FIG. 16 shows the emitting of the second signal 105 (e.g., at least one of the second signals 105a, 105b, 105c) as an indication that the door system 78 is opening at the end of the work-in-process cycle.

Figure 17:
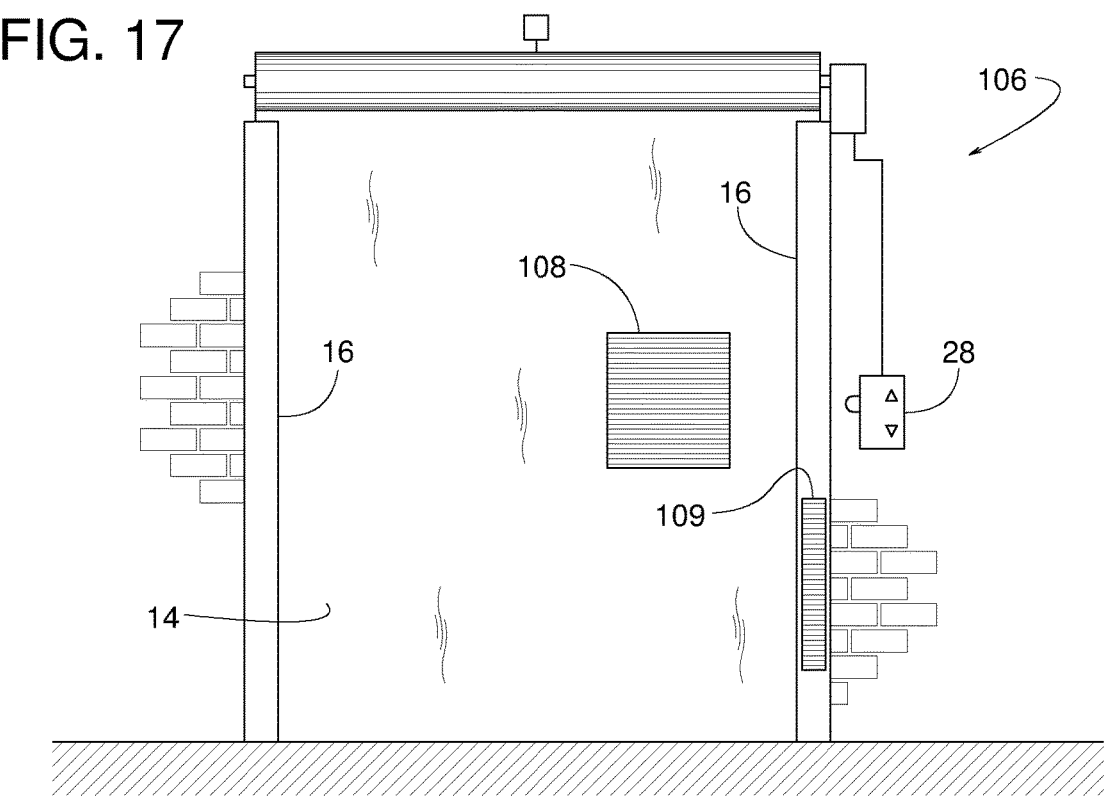
FIG. 17 is a front view of another example door system constructed in accordance with the teachings disclosed herein.
Figure 18:
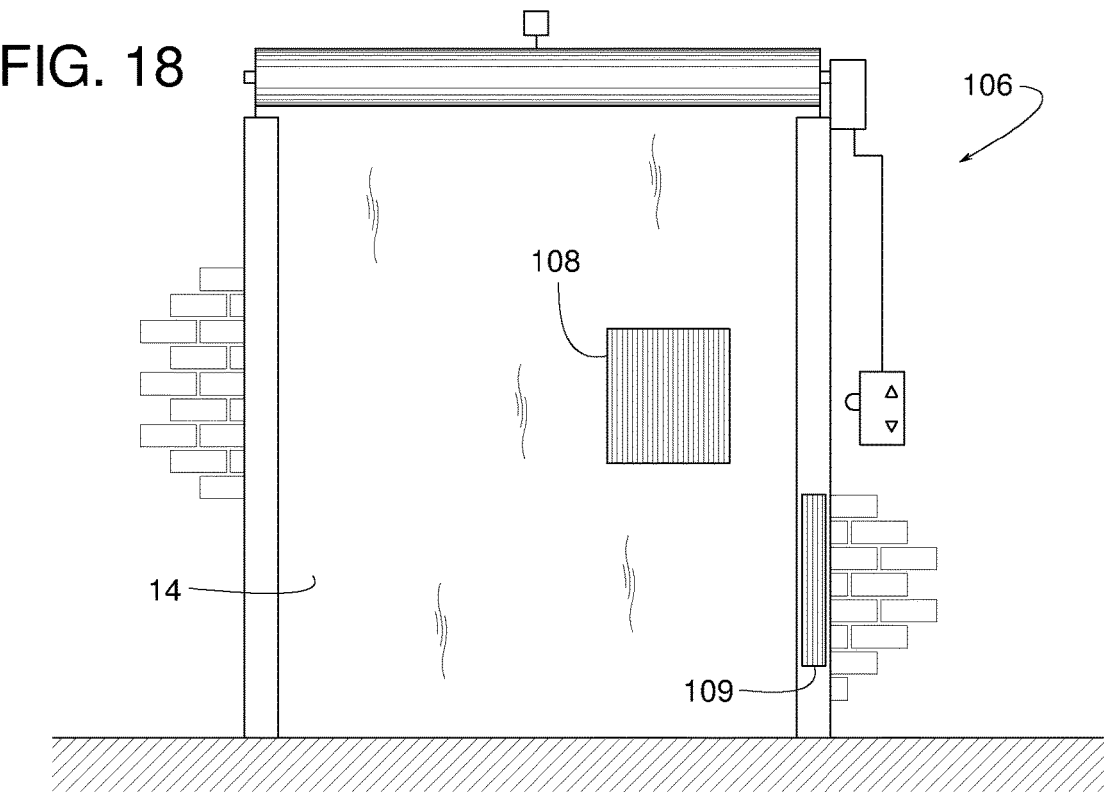
FIG. 18 is a front view similar to FIG. 17 but showing portions of the example door system having changed colors (e.g., from blue in FIG. 17 to red in FIG. 18).
Figure 19:
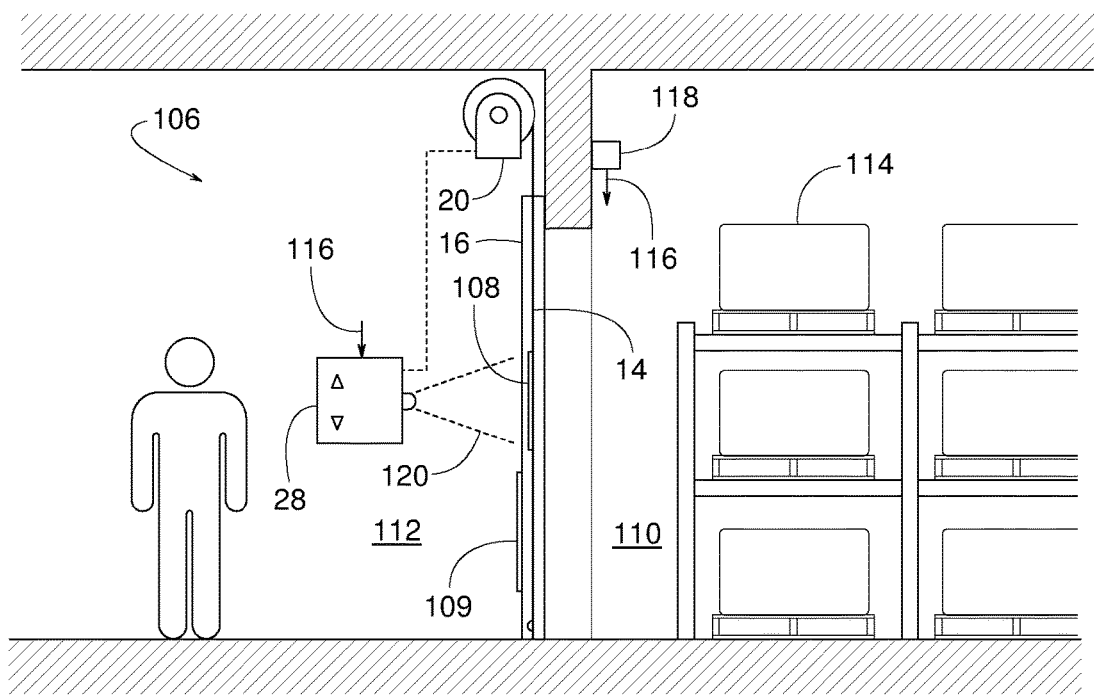
FIG. 19 is a side view of another example door system constructed in accordance with the teachings disclosed herein.

FIGS. 17, 18 and 19 show an example door system 106, wherein at least a portion 108 of the door panel 14 and/or at least a portion 109 of the doorframe 16 changes color in response to a change in a thermodynamic condition existing proximate the door system 106. Examples of such thermodynamic conditions include a temperature of a first area 110 adjacent a first side of the door panel 14, a temperature of a second area 112 adjacent a second side of the door panel 14, a temperature of the doorframe 16, a temperature of the door panel 14, a humidity of the first area 110, and a humidity of the second area 112. In some examples, the first area 110 is a refrigerated room for storing perishable goods 114, and the door panel 14 is thermally insulated.

In some examples, the portion 108 and/or the portion 109 is thermochromic and thereby changes color in response to its temperature. In other examples, the controller 28 receives a feedback signal 116 from a thermodynamic sensor 118 (e.g., temperature sensor, humidity sensor, barometric pressure sensor, etc.). Based on the feedback signal 116, the controller 28 projects light 120 of different colors to represent the changing thermodynamic conditions measured by the sensor 118. In some examples, the light 120 is projected onto the portion 108 and/or the portion 109 to change their color without the portions 108, 109 having to be of a thermochromic material.

Figure 20:
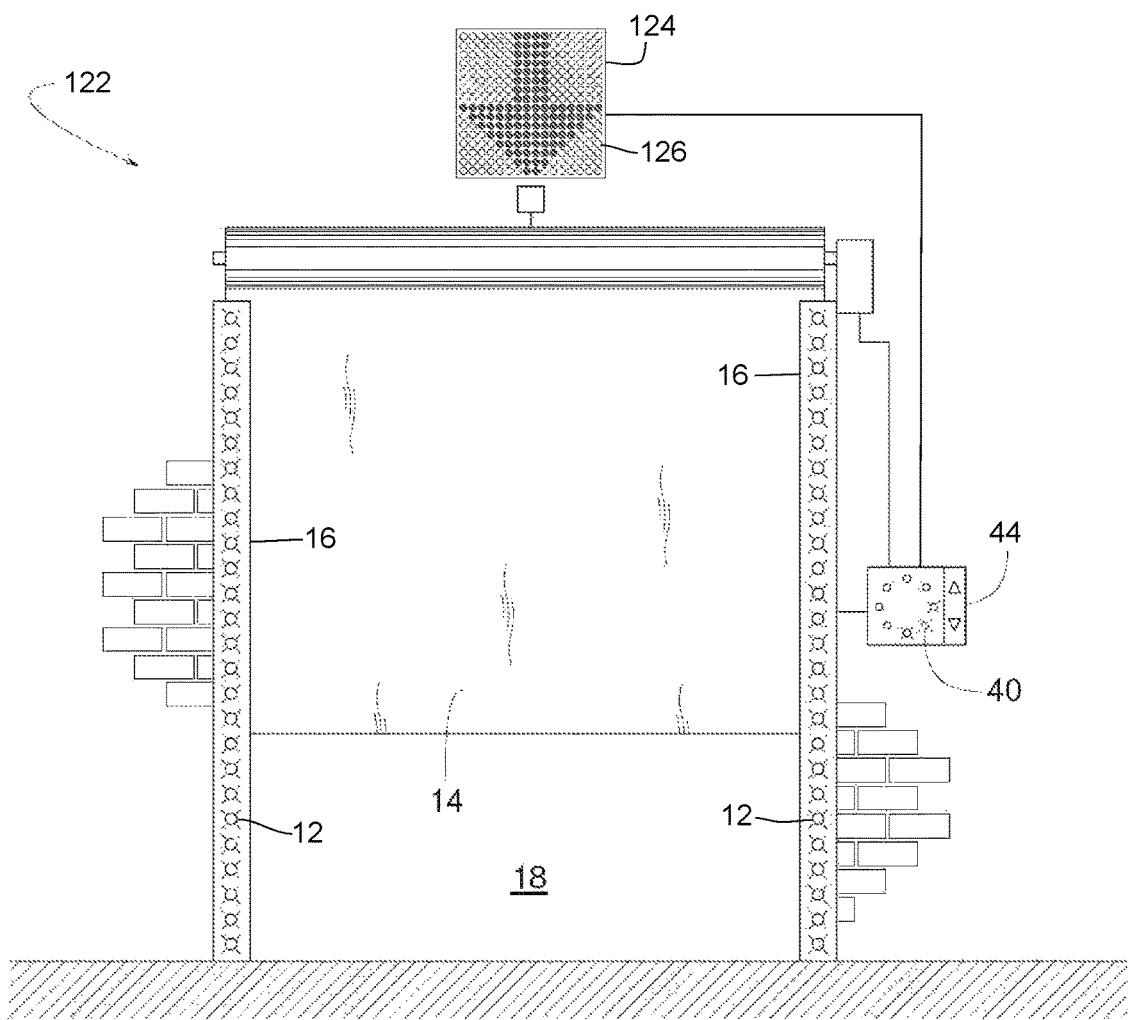
FIG. 20 is a front view of another example door system constructed in accordance with the teachings disclosed herein.

FIG. 20 shows an example door system 122 having a matrix display 124 having a two-dimensional array of lights 126 that is communicatively coupled to the controller 44. In some examples, the lights 126 are different colors to render icons, symbols, and/or animations on the matrix display 124 having one or more colors based on input from the controller 44. In some examples, the shapes of the icons and/or symbols are such that a brief glance at the matrix display 124 quickly indicates to an observer the operational status of the door system 122. For example, a down arrow (as shown) may indicate the door panel 14 is closing (or about to close) whereas an up arrow may indicate the door panel 14 is opening (or about to open). Further, in some examples, different colors of the icons and/or symbols, the use of flashing and/or animation indicates the importance of the icon and/or symbol. For example, a yellow down arrow may signify the door panel 14 is about to close (e.g., preannounces the closing) while a red down arrow may signify the door panel 14 is actually closing. A green square may indicate the door panel 14 is opening and waiting for further input while a green timer (e.g., a clock or an hourglass icon) may indicate the door is open but on a timer. In some such examples, the clock or hourglass is animated to indicate how much time remains before the door is to close. In some examples, a red octagon may indicate the door panel 14 is closed but is about to open (e.g., preannounces the opening). In some examples, a prohibition symbol (e.g., a circle with a slash through it) may indicate the interlock is disabled while an inverted triangle may serve as a warning of cross traffic. In some examples, the matrix display 124 may render an exclamation point to indicate a maintenance alert. In some examples, a large X on the matrix display 124 may indicate the door system 122 has faulted. Other icons and/or symbols may alternatively be used to represent other operational states and/or any of the operational states mentioned above. Further, any of the icons and/or symbols described above may be in any color capable to be rendered by the matrix display 124. In some examples, if the matrix display 124 loses communication with the controller 44, the matrix display 124 will generate a fault icon.

In some examples, the matrix display 124 is used in conjunction with the lights 12 on the doorframe 16, the lights 40 on the enclosure 42 of the controller 44, and/or any of the other example door systems described herein. In other examples, the matrix display 124 is used instead of the other example door systems described herein. In some examples, the matrix display 124 is positioned above the passageway 18 of the door. Additionally or alternatively, in some examples, the matrix display 124 is positioned to the side of the passageway 18. In some examples, the matrix display 124 is incorporated into the enclosure of the controller 44. The matrix display 124 may be of any suitable size to enable an observer to easily identify the icons or symbols rendered thereon after a brief glance. In some examples, the matrix display 124 is approximately 8×8 inches with 32×32 lights 126.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A door system for a passageway, the door system comprising:
   a door panel movable between an open position and a closed position, the door panel including a sheet extending continuously across a full height of the passageway when in the closed position;
   a display positionable adjacent the passageway to provide selectively different icons immediately identifiable by a person, a size of at least one of the different icons substantially filling the display, the different icons indicative of different operational states of the door system or an impending change in a corresponding operational state of the door system, a first icon to indicate a first impending change corresponding to movement of the door panel after a time period, the first icon corresponding to a timer indicating a countdown associated with the time period; and
   a controller to control operation of the door panel and the display.

2. The door system of claim 1, wherein at least one of the different icons is animated.

3. The door system of claim 1, wherein a second icon includes an arrow to indicate the door panel is at least one of closing, about to close, opening, or about to open.

4. The door system of claim 1, wherein a first one of the different operational states corresponds to when the door panel is opening and the door system is waiting for further input.

5. The door system of claim 1, wherein a second icon is to preannounce an opening of the door panel and a third icon is to preannounce a closing of the door panel, the third icon different than the second icon.

6. The door system of claim 1, wherein a first one of the different operational states corresponds to when an interlock is disabled.

7. The door system of claim 1, wherein a second icon serves as a warning of cross traffic.

8. The door system of claim 1, wherein a second icon indicates when the door system has faulted.

9. The door system of claim 1, wherein a second icon indicates a maintenance alert.

10. A door system comprising:
a door panel movable between a closed position and an open position to respectively block and unblock a passageway, the door panel including a sheet extending continuously across a full height of the passageway when in the closed position;
a controller to control operation of the door panel; and
a matrix display positionable adjacent the passageway in communication with the controller, the display to provide a symbol viewable by a person facing the display, the symbol indicative of an operational state of the door system, the controller to cause the display to change the symbol based on at least one of a change in the operational state of the door system or an impending change in the operational state of the door system, the impending change in the operational state corresponding to movement of the door panel after a time period, the symbol corresponding to a timer indicating a countdown associated with the time period.

11. The door system of claim 10, wherein the display is to provide a fault icon when communication with the controller is lost.

12. The door system of claim 10, wherein the symbol has a common shape both when the door system is in a first operational state and when the first operational state is impending, the symbol provided via at least one of different colors or flashing to distinguish when the door system is in the first operational state from when the first operational state is impending.

13. The door system of claim 12, wherein the first state corresponds to one of the door panel moving to the closed position or the door panel moving to the open position.

14. The door system of claim 10, wherein the display corresponds to a two-dimensional array of lights.

15. A door system comprising:
a door panel movable between a closed position and an open position to respectively block and unblock a passageway, the door panel including a sheet extending continuously across a full height of the passageway when in the closed position;
a graphical display positionable adjacent the passageway; and
a controller within an enclosure, the controller to control operation of the door panel, the controller to be in communication with the display to cause the display to provide an icon representative of at least one of a current operational state of the door system or an impending change in the current operational state of the door system, the impending change in the current operational state corresponding to movement of the door panel after a time period, the icon corresponding toe a timer indicating a countdown associated with the time period, the display being larger than the enclosure.

16. The door system of claim 1, further including a series of lights to be distributed adjacent the passageway along a travel direction of the door panel, the series of lights to provide a visual indication of a status of the door system separate from the display.

17. The door system of claim 1, wherein the controller includes a user interface separate from the display, the user interface to provide at least one of a visual indication of a status of the door system or an actuator to enable operation of the door system, the display to be spaced apart from an enclosure of the controller.

* * * * *